Sept. 5, 1950      A. J. MEENTS      2,521,391

TRAILER HITCH

Filed May 22, 1947

A. J. Meents
INVENTOR

BY *C. A. Snow & Co.*
ATTORNEYS.

Patented Sept. 5, 1950

2,521,391

UNITED STATES PATENT OFFICE 2,521,391

TRAILER HITCH

Adolf J. Meents, Newell, Iowa

Application May 22, 1947, Serial No. 749,781

1 Claim. (Cl. 280—33.15)

This invention relates to a new and improved automatic hitch or coupler for trailers and the like of which the following is a specification.

The primary object of this invention resides in the provision of an improved hitch or the like to be used between a powered vehicle and a trailer which is automatic in its coupling and releasing operation being easily operable from a remote point, such as within the powered vehicle.

Another object of this invention lies in the provision of an automatic hitch which rigidly connects a trailer to a drawing vehicle in a manner preventing forward and rearward play yet having a construction permitting a substantially universal movement between said vehicles to absorb shock and strains caused by uneven and rough roads.

Still another object of this invention is the provision of such a hitch as described which is of a simple and durable design and construction but relatively cheap of manufacture.

Still further improvements and advantages of this invention will readily appear to those skilled in the art when the following description is read in the light of the accompanying drawings in which.

Figure 1:
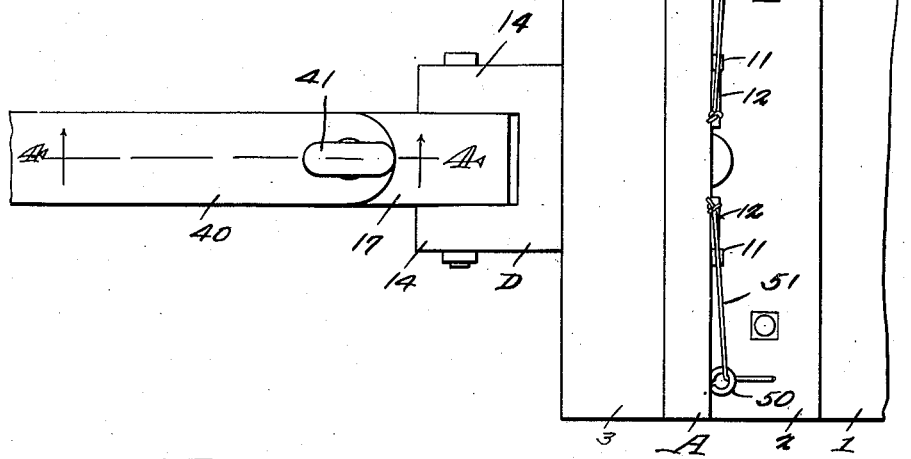
Fig. 1 is a top plan view of the assembled hitch.
Figure 2:
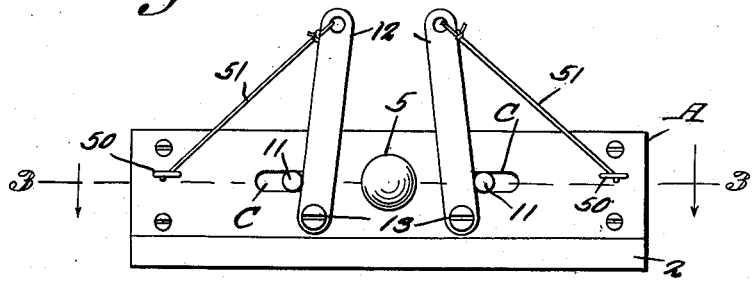
Fig. 2 is a forward elevation of the hitch.
Figure 3:
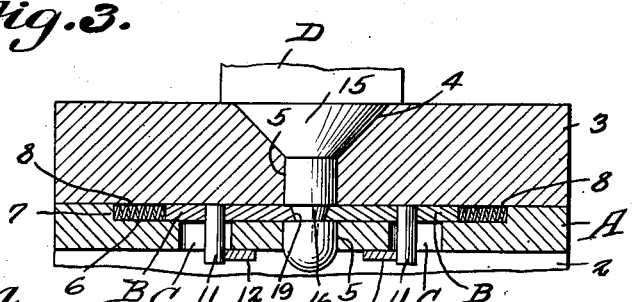
Fig. 3 is a horizontal section taken on line 3—3 of Fig. 2.
Figure 4:
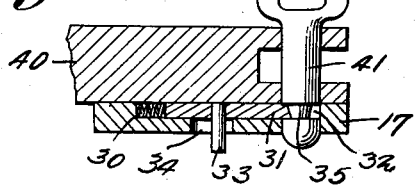
Fig. 4 is a vertical section taken on line 4—4 of Fig. 1.

Referring now to the accompanying drawings which illustrate the preferred embodiment of the invention and in which like numerals indicate similar parts throughout, A designates a solid rectangular metallic block rigidly secured horizontally transverse the rear end of a tractor 1, or like powered vehicle, by a horizontal flange 2 extending forward therefrom. A second block 3 of greater width than block A, but of the same depth and length, is bolted to the back face thereof in a coinciding position. This rearward block 3 is provided with a central aperture 4 in its rearward face which tapers, in conical configuration, forward for a spaced distance through said block and then from substantially the center of said block it forms a circular passage 5 which opens through the forward face of the forward block A.

A circular tunnel 6 is formed between the abutting faces of the two blocks A and 3, longitudinally therewith and intermediate their depth so that the tunnel passes centrally through the passage 5. This tunnel 6 terminates at an equidistance from each end of the blocks in a flat butt end 7.

Two identical bars B are slidably housed in the tunnel 6 one on each side of the passage 5 and each seated against a coil spring 8 at their outer ends which cause the bars to normally extend across the passage 5 in end to end relationship. The adjacent ends 9 of these bars are tapered each from the forward side of the passage to an increased taper rearwardly.

A pair of horizontally elongated apertures C open, from spaced distances on either side of the passage 5, inward the forward face of the block A into the tunnel 6, and pins 11, secured one in each of the bars B, extend outward said apertures beyond the forward face of the block A.

A pair of arms 12 are pivoted, as at 13, to the forward face of the block A each beneath and slightly within each of the apertures C therein. These arms extend upward inside of the pins 11 and are adapted, by the outer pivotation of the upper ends thereof, to move said pins outward in said apertures and hence the bars B are moved outward against their seating springs thus spacing their adjacent ends without the passage 5.

A rectangular block D is provided at one end thereof with horizontal forked projections 14, and at the second end with formed projection 15 adapted to snugly fill the aperture 4 and passage 5 within the blocks A and 3 with sufficient length to extend for a spaced distance beyond the forward face of the block A when inserted in said aperture and passage from the rear of the block 3.

That portion 16, of the projection 15, transgressing the tunnel 6 is of a reduced tapered conical cross section permitting the bar ends 19 to engage the projection and lock the same within the blocks as illustrated.

The rearwardly projecting forks 14 carry a short tongue bar 17 vertically pivoted therebetween and said bar is provided with a longitudinal tunnel 30 therein with a spring seated bar 31 resiliently closing a vertical passage 32 therethrough. A pin 33 carried from said bar outward through an elongated aperture 34 in the bottom of the tongue bar 17 permits the controlled movement of the bar within the tunnel.

A trailer tow bar 40 carrying a vertical pin 41 therein is adapted to lie upon the tongue bar with the pin extending through the passage 32 therein, and said pin is provided with a reduced diameter portion 35 adapted to be engaged by the bar 31 to lock said pin to said tongue and permit the horizontal pivotation of the tow bar about the tongue.

Thus from the foregoing it may be readily seen that the trailer is rigidly hitched to the powered vehicle through the projection 15 in the blocks A and 3, while there is a possible vertical and horizontal pivotation of the tongue and tow bar to impart the desired universal action between the vehicles.

To make the hitch operable from the powered vehicle it is merely necessary to secure an eye hook 50 outward from each of the arms in the forward face of the block A, and a pair of lines 51 are carried rearward from the powered vehicle one through each of the eyes to be secured to the upper end of the adjacent arm 12.

Thus the operator, by pulling the lines 51, may cause the outward movement of the arms 12 to cause the release of the coupling bars B substantially as described.

Having thus described and explained the construction and function of this invention and with the understanding that I contemplate any and all modifications that fall within the scope of the appended claim what I desire to claim in Letters Patent is:

An automatic coupling of the character described, comprising a solid block provided with a chamber opening therethrough, one end of said chamber being cone-shaped, a coupling member provided with a projection, the inner end of which is cone-shaped for positioning within the cone-shaped end of the chamber, said projection having an annular groove adjacent to the outer end thereof, identical bars slidably mounted within the block, said bars having tapered forward edges movable into the groove of the projection gripping opposite sides of the projection, pins extending from the bars and passing through openings in the block, pivoted arms mounted on the block and engaging the pins, pull lines secured to said arms moving the pins and bars in one direction, disengaging the bars and projection, releasing the coupling member, and springs engaging the bars normally urging the bars into the groove.

ADOLF J. MEENTS.

REFERENCES CITED

The following references are of record in the file of this patent:

UNITED STATES PATENTS

| Number | Name | Date |
| --- | --- | --- |
| 1,333,384 | Buller | Mar. 9, 1920 |
| 1,543,304 | Tomlinson | June 23, 1925 |
| 1,680,236 | Zimmerman | Aug. 7, 1928 |
| 1,879,052 | Bounds | Sept. 27, 1932 |
| 2,062,788 | Jacob | Dec. 1, 1936 |
| 2,133,065 | Weber | Oct. 11, 1938 |
| 2,170,983 | Adams | Aug. 29, 1939 |
| 2,221,492 | Sawyer | Nov. 12, 1940 |